(12) United States Patent
Stoehr et al.

(10) Patent No.: US 8,859,472 B2
(45) Date of Patent: *Oct. 14, 2014

(54) USE OF ESTER GROUP-INCLUDING POLYMERS AS ANTIFATIGUE ADDITIVES

(75) Inventors: Torsten Stoehr, Frankfurt (DE);
Michael Mueller, Bensheim (DE);
Thorsten Bartels, Weisenheim (DE);
Christoph Wincierz, Darmstadt (DE);
Klaus Schimossek, Benshiem (DE);
Michael Neusius, Darmstadt (DE);
Dieter Janssen, Gross-Umstadt (DE);
Miriam-Kathrin Stihulka, Maintal (DE)

(73) Assignee: Evonik RohMax Additives GmbH, Darmstadt (DE)

( * ) Notice: Subject to any disclaimer, the term of this patent is extended or adjusted under 35 U.S.C. 154(b) by 690 days.

This patent is subject to a terminal disclaimer.

(21) Appl. No.: 12/672,231

(22) PCT Filed: Jun. 20, 2008

(86) PCT No.: PCT/EP2008/057828
§ 371 (c)(1),
(2), (4) Date: Feb. 4, 2010

(87) PCT Pub. No.: WO2009/019065
PCT Pub. Date: Feb. 12, 2009

(65) Prior Publication Data
US 2011/0237473 A1 Sep. 29, 2011

(30) Foreign Application Priority Data
Aug. 6, 2007 (DE) .................. 10 2007 036 856

(51) Int. Cl.
*C07D 295/18* (2006.01)
*C07C 69/34* (2006.01)
*C10M 145/14* (2006.01)
*C08F 293/00* (2006.01)
*C10M 149/10* (2006.01)
*C08F 265/04* (2006.01)

(52) U.S. Cl.
CPC .......... *C10M 145/14* (2013.01); *C08F 293/005* (2013.01); *C10M 2225/02* (2013.01); *C08F 2438/01* (2013.01); *C10N 2230/06* (2013.01); *C10M 2209/084* (2013.01); *C10M 149/10* (2013.01); *C10M 2207/028* (2013.01); *C08F 265/04* (2013.01); *C10M 2217/023* (2013.01)
USPC ........................... 508/249; 508/466; 508/470

(58) Field of Classification Search
USPC .................. 508/249, 463, 465, 466, 469, 470
See application file for complete search history.

(56) References Cited

U.S. PATENT DOCUMENTS

| | | | |
|---|---|---|---|
| 3,816,314 A | 6/1974 | Pappas et al. | |
| 2004/0132629 A1 | 7/2004 | Vinci et al. | |
| 2005/0148749 A1 | 7/2005 | Scherer et al. | |
| 2006/0189490 A1 | 8/2006 | Dardin et al. | |
| 2006/0240999 A1* | 10/2006 | Placek et al. ............ | 508/469 |
| 2007/0191238 A1 | 8/2007 | Fischer et al. | |
| 2007/0197409 A1 | 8/2007 | Scherer et al. | |
| 2007/0213237 A1 | 9/2007 | Scherer et al. | |
| 2007/0219101 A1 | 9/2007 | Scherer et al. | |
| 2008/0015131 A1 | 1/2008 | Vinci et al. | |
| 2008/0146475 A1 | 6/2008 | Mueller et al. | |
| 2008/0194443 A1 | 8/2008 | Stohr et al. | |
| 2009/0048406 A1 | 2/2009 | Iroff et al. | |
| 2009/0064568 A1 | 3/2009 | Stohr et al. | |
| 2009/0182145 A1 | 7/2009 | Boehmke et al. | |

FOREIGN PATENT DOCUMENTS

| | | |
|---|---|---|
| DE | 10 2004 034 618 | 2/2006 |
| WO | WO 2006/007934 A1 | 1/2006 |
| WO | 2006 105926 | 10/2006 |
| WO | WO 2007/025837 A1 | 3/2007 |

OTHER PUBLICATIONS

U.S. Appl. No. 13/202,744, filed Aug. 22, 2011, Eisenberg, et al.
U.S. Appl. No. 13/255,218, filed Sep. 7, 2011, Eisenberg, et al.
U.S. Appl. No. 61/421,867, filed Dec. 10, 2010, Radano, et al.
U.S. Appl. No. 61/408,274, filed Oct. 29, 2010, Neveu, et al.
U.S. Appl. No. 61/421,870, filed Dec. 10, 2010, Radano.
U.S. Appl. No. 11/995,949, filed Jan. 17, 2008, Stoehr, et al.
U.S. Appl. No. 12/668,209, filed Jan. 8, 2010, Stoehr, et al.
U.S. Appl. No. 61/186,744, filed Jun. 12, 2009, Radano, et al.
U.S. Appl. No. 13/213,547, filed Aug. 19, 2011, Mueller, et al.
U.S. Appl. No. 13/318,492, filed Nov. 2, 2011, Radano, et al.
U.S. Appl. No. 61/393,076, filed Oct. 14, 2010, Langston, et al.
U.S. Appl. No. 61/527,800, filed Aug. 26, 2011, McElwain, et al.
U.S. Appl. No. 61/421,876, filed Dec. 10, 2010, Radano.
Japanese Office Action Issued Nov. 22, 2012 in Patent Application No. 2010-519391 (Germany translation only).

* cited by examiner

*Primary Examiner* — Vishal Vasisth
(74) *Attorney, Agent, or Firm* — Oblon, Spivak, McClelland, Maier & Neustadt, L.L.P.

(57) ABSTRACT

The present invention relates to the use of ester group-including polymers having at least one nonpolar segment P and at least one polar segment D, where the polar segment D includes at least 8 repeating units, and the proportion of dispersing repeating units in the polar segment D is at least 30% by weight based on the weight of the polar segment D, as antifatigue additive in lubricants.

18 Claims, No Drawings

USE OF ESTER GROUP-INCLUDING POLYMERS AS ANTIFATIGUE ADDITIVES

This application is a 371 of PCT/EP2008/057828, filed Jun. 20, 2008.

The present invention relates to the use of polymers comprising ester groups as antifatigue additives.

For reasons of fuel economy, a task being addressed in modern research is that of reducing churning loss and internal friction of oils more and more. As a result, there has been a trend in the last few years toward ever lower viscosities of the oils used and hence ever thinner lubricant films, especially at high temperatures. An adverse consequence of this trend is the fact that an increased level of damage, especially on transmissions and roller bearings, is occurring in use.

In the design of a transmission, it should be ensured that all sliding and rolling contact sites, i.e. gearings and roller bearings, are lubricated sufficiently in all operating states. Damage to gears and roller bearings are the consequence of excessive local stress. A distinction is drawn here between two groups of faults at metallic surfaces of transmissions, especially at gearings and roller bearings:

1. Wear resulting from continuous surface material removal or scuffing as a result of abrupt material removal after surface wear of both friction partners.
2. Fatigue which becomes visible through gray staining (surface fatigue, micro-pitting) or craters (sub-surface fatigue, pitting). This damage is caused by flaking-off or breaking-out of material owing to cracks, which are caused 20-40 μm or 100-500 μm below the surface by shear stresses in the metal lattice.

The types of damage mentioned are commonly known for gearings and roller bearings, and are described in detail, for example, in the publications "Gears—Wear and Damage to Gear Teeth", ISO DIS 10825 and "Wälzlagerschäden" [Damage to roller bearings], Publ.-No. WL 82 102/2 DA from FAG (Schaeffler KG), Schweinfurt 2004.

Wear resulting from continuous surface material removal occurs on gearings and roller bearings preferentially at low speeds, at which the surface roughnesses come into contact owing to too thin a lubricant film. The material degradation which results from this mechanism is shown, for example, in FIG. 10.10 in T. Mang, W. Dresel (eds.): "Lubricants and Lubrication", Wiley-VCH, Weinheim 2001, in which a tooth flank with significant manifestations of wear is shown. Inhomogeneous wear, which can be seen in the form of streak formation on a roller bearing, is shown in "Wälzlagerschäden", Publ.-No. WL 82 102/2 DA from FAG (Schaeffler KG), Schweinfurt 2004, in FIG. 68.

Lubricants have a favorable effect with regard to wear resistance when they comprise antiwear (AW) additives and are of high viscosity.

Scuffing on tooth flanks usually occurs at moderate to high speeds. The surfaces in contact become welded briefly and immediately fall apart again. A typical manifestation of such damage is shown, for example, in FIG. 10.11 in T. Mang, W. Dresel (eds.): "Lubricants and Lubrication", Wiley-VCH, Weinheim 2001. The damage occurs on intermeshing flank areas, where very high sliding speeds are present (often on the tooth head). This is damage which occurs abruptly, which can be caused merely by a single overload. Scuffing damage likewise occurs in roller bearings; this is observed especially on large bearings, for example in transmissions of cement mills. Owing to excessively low operating viscosity, excessively high stresses and/or excessively high speeds, there is insufficient lubricant film formation between the rollers and cup (for example of a tapered roller bearing), and leads to local welding (cf. FIG. 81 "Wälzlagerschäden", Publ.-No. WL 82 102/2 DA from FAG (Schaeffler KG), Schweinfurt 2004).

Scuffing damage can be reduced by more than a factor of 5 by extreme pressure (EP) additives in the lubricant.

The material fatigue described above under point 2 is manifested especially by gray staining and crater formation.

Gray staining begins at first 20-40 μm below the surface with fine cracks in the metal lattice. The crack propagates to the surface and leads to material flaking off, which is evident as visible gray staining. In the case of gearings, gray staining can be observed on tooth flanks virtually in all speed ranges. Gray staining occurs preferentially in the area of sliding contact, which is shown, for example, in FIG. 10.13 in T. Mang, W. Dresel (eds.): "Lubricants and Lubrication", Wiley-VCH, Weinheim 2001. In roller bearings too, very flat erruptions arise as gray staining on the raceway in the area of sliding contact, as shown by way of example in "Wälzlagerschäden", Publ.-No. WL 82 102/2 DA from FAG (Schaeffler KG), Schweinfurt 2004, in FIG. 49.

Crater formation is likewise fatigue damage which is observed in all speed ranges. Here too, the damage begins with a crack in the metal lattice at a depth of 100-500 μm. The crack finally propagates to the surface and leaves, after breakout, a pronounced crater. In the case of gears, these occur preferably at the middle of the tooth flanks, and in roller bearings usually on the rotating bearing rings. Figures showing this damage can be found in publications including T. Mang, W. Dresel (eds.): "Lubricants and Lubrication", Wiley-VCH, Weinheim 2001 (cf. FIG. 10.14 and FIG. 10.15) and in "Wälzlagerschäden", Publ.-No. WL 82 102/2 DA from FAG (Schaeffler KG), Schweinfurt 2004 (cf. FIG. 43). In contrast to gray staining, the damage thus proceeds in the area of rolling contact, since the greatest stress and the greatest amplitudes of load change are present there in each case.

In clear contrast to the faults of "wear" and "scuffing", the much more serious fatigue faults of "gray staining" and "craters" at present cannot be influenced in a controlled manner with additives, for instance the antiwear and extreme pressure additives described above (cf. R. M. Mortier, S. T. Orszulik (eds.): "Chemistry and Technology of Lubricants", Blackie Academic & Professional, London, $2^{nd}$ ed. 1997; J. Bartz: "Additive für Schmierstoffe" [Additives for Lubricants], Expert-Verlag, Renningen-Malmsheim 1994; T. Mang, W. Dresel (eds.): "Lubricants and Lubrication", Wiley-VCH, Weinheim 2001). Studies to date have been able to show, if anything, only that gray staining resistance and crater resistance can be influenced via the lubricant viscosity. An increased viscosity here has a prolonging effect on fatigue time (cf. U. Schedl: "FVA-Forschungsvorhaben 2/IV: Pittingtest—Einfluss der Schmierstoffs auf die Grübchenlebensdauer einsatzgehärteter Zahnräder im Einstufen- und Lastkollektivversuch", Forschungsvereinigung Antriebstechnik, Book 530, Frankfurt 1997).

To improve the viscosity properties, polyalkyl (meth)acrylates (PAMA) have been used for some time in lubricant oils, for example transmission or motor oils, and some of them may be functionalized with comonomers, especially nitrogen- or oxygen-containing monomers. These VI improvers include especially polymers which have been functionalized with dimethylaminoethyl methacrylate (U.S. Pat. No. 2,737,496 to E. I. Dupont de Nemours and Co.), dimethylaminoethylmethacrylamide (U.S. Pat. No. 4,021,357 to Texaco Inc.) or hydroxyethyl methacrylate (U.S. Pat. No. 3,249,545 to Shell Oil. Co).

VI improvers based on PAMA for lubricant oil applications are constantly being improved. For instance, there have recently also been many descriptions of polymers with block sequences for use in lubricant oils.

For example, publication U.S. Pat. No. 3,506,574 to Rohm and Haas describes sequential polymers consisting of a PAMA base polymer, which is grafted with N-vinylpyrrolidone in a subsequent reaction.

Moreover, publications WO 2001/40339 and DE 10 2005 041 528 to RohMax Additives GmbH describe, respectively, block copolymers and star block copolymers for lubricant oil applications, which are obtainable by means of ATRP among other methods.

Advantageousness of the block structure for wear-reducing additive functions of the VI improvers or for reducing friction, which leads to lower fuel consumption, has also already been demonstrated.

WO 2004/087850 describes lubricant oil formulations which comprise block copolymers and have excellent friction properties. The block copolymers act as friction modifiers.

WO 2006/105926 describes, inter alia, block copolymers derived from specially selected N/O functional monomers, and the use thereof as friction modifiers and dispersants.

WO 2006/007934 to RohMax Additive GmbH describes the use of graft copolymers as an antiwear additive in lubricant oil formulations, especially in motor oils. WO 2005/097956 to RohMax Additives likewise describes lubricant oil formulations comprising H-bond-containing graft polymers as antiwear additives.

As described above, there have been many attempts to date to prevent damage owing to wear or scuffing through use of additives. However, material fatigue can only be countered by the use of oils with a relatively high viscosity or by use of specific materials for gearing and/or roller bearings. However, both options are afflicted with disadvantages, the use of new materials being expensive and a further improvement being desirable. The use of high-viscosity oils leads to high internal friction and hence to high fuel consumption. Therefore, especially compounds which can be used as antifatigue additives, without this being associated with an increase in viscosity of the lubricant, would be helpful.

In view of the prior art, it was thus an object of the present invention to provide an additive which leads to a reduction in material fatigue (antifatigue additive). This should especially achieve a reduction in the above-described formation of gray staining (surface fatigue, micro-pitting) or craters (sub-surface fatigue, pitting).

It was a further object of the invention to provide additives which can be produced in a simple and inexpensive manner, and commercially available components in particular should be used. At the same time, production should be possible on the industrial scale, without new plants or plants of complex construction being required for that purpose.

It was a further aim of the present invention to provide an additive which brings about a multitude of desirable properties in the lubricant. This can minimize the number of different additives.

Furthermore, the additive should not exhibit any adverse effects on the fuel consumption or the environmental compatibility of the lubricant.

These objects, and further objects which are not stated explicitly but are immediately derivable or discernible from the connections discussed herein by way of introduction, are achieved by the use of polymers which comprise ester groups and have at least one nonpolar segment P and at least one polar segment D, having all features of claim 1.

The present invention accordingly provides for the use of polymers which comprise ester groups and have at least one nonpolar segment P and at least one polar segment D, said polar segment D having at least eight repeat units and the proportion by weight of dispersing repeat units in the polar segment D being at least 30%, based on the weight of the polar segment D, as an antifatigue additive in lubricants.

It is thus possible in an unforeseeable manner to provide an additive for lubricant oils, which leads to a reduction in material fatigue (antifatigue additive). At the same time, these additives achieve a decrease in the above-described formation of gray staining (surface fatigue, micro-pitting) or craters (sub-surface fatigue, pitting).

Furthermore, these additives can be prepared in a simple and inexpensive manner, and it is possible to use commercially available components in particular. At the same time, production is possible on the industrial scale, without new plants or plants of complex construction being required for that purpose.

Furthermore, the polymers for use in accordance with the invention exhibit a particularly favorable profile of properties. For instance, the polymers can be configured so as to be surprisingly shear-stable, such that the lubricants have a very long service life. In addition, the additive for use in accordance with the invention may bring about a multitude of desirable properties in the lubricant. For example, it is possible to produce lubricants with outstanding low-temperature properties or viscosity properties, which comprise the present polymers comprising ester groups. This allows the number of different additives to be minimized. Furthermore, the present polymers comprising ester groups are compatible with many additives. This allows the lubricants to be adjusted to a wide variety of different requirements.

Furthermore, the additives for use do not exhibit any adverse effects on fuel consumption or the environmental compatibility of the lubricant.

Polymers comprising ester groups are understood in the context of the present invention to mean polymers obtainable by polymerizing monomer compositions which comprise ethylenically unsaturated compounds having at least one ester group, which are referred to hereinafter as ester monomers. Accordingly, these polymers contain ester groups as part of the side chain. These polymers include especially polyalkyl (meth)acrylates (PAMA), polyalkyl fumarates and/or polyalkyl maleates.

Ester monomers are known per se. They include especially (meth)acrylates, maleates and fumarates, which may have different alcohol radicals. The expression "(meth)acrylates" encompasses methacrylates and acrylates, and mixtures of the two. These monomers are widely known.

The polymer comprising ester groups comprises preferably at least 40% by weight, more preferably at least 60% by weight, especially preferably at least 80% by weight and most preferably at least 90% by weight of repeat units derived from ester monomers.

Polymers usable in accordance with the invention comprise at least one nonpolar segment P and at least one polar segment D, said polar segment D having at least eight repeat units and the proportion by weight of dispersing repeat units in the polar segment D being at least 30%, based on the weight of the polar segment D.

The term "repeat unit" is widely known in the technical field. The present polymers can preferably be obtained by means of free-radical polymerization of monomers. This opens up double bonds to form covalent bonds. Accordingly, the repeat unit arises from the monomers used.

The inventive polymers have polar and nonpolar segments. The term "segment" in this context denotes a section of the polymer. The segments may have an essentially constant composition composed of one or more monomer units. In addition, the segments may have a gradient, in which case the concentration of different monomer units (repeat units) varies over the segment length. The polar segments D differ from the nonpolar segments P via the proportion of dispersing monomers. The nonpolar segments may have at most a small proportion of dispersing repeat units (monomer units), whereas the polar segments comprise a high proportion of dispersing repeat units (monomer units).

Dispersing monomers are understood to mean especially monomers with functional groups, for which it can be assumed that polymers with these functional groups can keep particles, especially soot particles, in solution (cf. R. M. Mortier, S. T. Orszulik (eds.): "Chemistry and Technology of Lubricants", Blackie Academic & Professional, London, 2$^{nd}$ ed. 1997). These include especially monomers which have boron-, phosphorus-, silicon-, sulfur-, oxygen- and nitrogen-containing groups, preference being given to oxygen- and nitrogen-functionalized monomers.

The polar segments D comprise, in accordance with the invention, at least 8, preferably at least 12 and most preferably at least 15 repeat units. At the same time, the polar segments D comprise at least 30% by weight, preferably at least 40% by weight, of dispersing repeat units, based on the weight of the polar segment D. In addition to the dispersing repeat units, the polar segments may also have repeat units which do not have any dispersing effect. The polar segment may have a random structure, such that the different repeat units have a random distribution over the segment length. In addition, the polar segment may have a block structure or a structure in the form of a gradient, such that the non-dispersing repeat units and the dispersing repeat units within the polar segment have an inhomogeneous distribution.

The nonpolar hydrophobic segment P may comprise a small proportion of dispersing repeat units, which is preferably less than 20% by weight, more preferably less than 10% by weight and most preferably less than 5% by weight, based on the weight of the nonpolar segment P. In a particularly appropriate configuration, the nonpolar segment P comprises essentially no dispersing repeat units.

The nonpolar segment P of the polymer comprising ester groups may have 5 to 100% by weight, especially 20 to 98% by weight, preferably 30 to 95 and most preferably 70 to 92% by weight of repeat units derived from ester monomers having 7 to 15 carbon atoms in the alcohol radical.

In a particular aspect, the nonpolar segment P of the polymer comprising ester groups may have 0 to 80% by weight, preferably 0.5 to 60% by weight, more preferably 2 to 50% by weight and most preferably 5 to 20% by weight of repeat units derived from ester monomers having 16 to 40 carbon atoms in the alcohol radical.

In addition, the nonpolar segment P of the polymer comprising ester groups may have 0 to 40% by weight, preferably 0.1 to 30% by weight and more preferably 0.5 to 20% by weight of repeat units derived from ester monomers having 1 to 6 carbon atoms in the alcohol radical.

The nonpolar segment P of the polymer comprising ester groups comprises preferably at least 40% by weight, more preferably at least 60% by weight, especially preferably at least 80% by weight and most preferably at least 90% by weight of repeat units derived from ester monomers.

Mixtures from which the nonpolar segments of the inventive polymers comprising ester groups are obtainable may contain 0 to 40% by weight, especially 0.1 to 30% by weight and more preferably 0.5 to 20% by weight of one or more ethylenically unsaturated ester compounds of the formula (I)

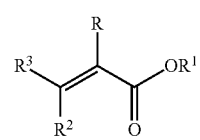

(I)

in which R is hydrogen or methyl, $R^1$ is a linear or branched alkyl radical having 1 to 6 carbon atoms, $R^2$ and $R^3$ are each independently hydrogen or a group of the formula —COOR' in which R' is hydrogen or an alkyl group having 1 to 6 carbon atoms.

Examples of component (I) include (meth)acrylates, fumarates and maleates which derive from saturated alcohols, such as methyl (meth)acrylate, ethyl (meth)acrylate, n-propyl (meth)acrylate, iso-propyl (meth)acrylate, n-butyl (meth)acrylate, tert-butyl (meth)acrylate and pentyl (meth)acrylate, hexyl (meth)acrylate;

cycloalkyl (meth)acrylates such as cyclopentyl (meth)acrylate, cyclohexyl (meth)acrylate;

(meth)acrylates which derive from unsaturated alcohols, such as 2-propynyl (meth)acrylate, allyl (meth)acrylate and vinyl (meth)acrylate.

The compositions to be polymerized to prepare the nonpolar segments P preferably contain 5 to 100% by weight, preferably 10 to 98% by weight and especially preferably 20 to 95% by weight of one or more ethylenically unsaturated ester compounds of the formula (II)

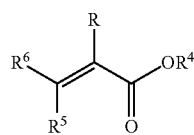

(II)

in which R is hydrogen or methyl, $R^4$ is a linear or branched alkyl radical having 7 to 15 carbon atoms, $R^5$ and $R^6$ are each independently hydrogen or a group of the formula —COOR" in which R" is hydrogen or an alkyl group having 7 to 15 carbon atoms.

Examples of component (II) include:

(meth)acrylates, fumarates and maleates which derive from saturated alcohols, such as 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate;

(meth)acrylates which derive from unsaturated alcohols, for example oleyl (meth)acrylate;

cycloalkyl (meth)acrylates, such as 3-vinylcyclohexyl (meth)acrylate, bornyl (meth)acrylate; and the corresponding fumarates and maleates.

In addition, preferred monomer compositions for preparing the nonpolar segments P comprise 0 to 80% by weight, preferably 0.5 to 60% by weight, more preferably 2 to 50% by weight and most preferably 5 to 20% by weight of one or more ethylenically unsaturated ester compounds of the formula (III)

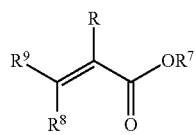

(III)

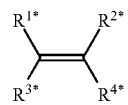

in which R is hydrogen or methyl, $R^7$ is a linear or branched alkyl radical having 16 to 40, preferably 16 to 30, carbon atoms, $R^8$ and $R^9$ are each independently hydrogen or a group of the formula —COOR''' in which R''' is hydrogen or an alkyl group having 16 to 40, preferably 16 to 30, carbon atoms.

Examples of component (III) include (meth)acrylates which derive from saturated alcohols, such as hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate;

cycloalkyl (meth)acrylates such as 2,4,5-tri-t-butyl-3-vinylcyclohexyl (meth)acrylate, 2,3,4,5-tetra-t-butylcyclohexyl (meth)acrylate; and the corresponding fumarates and maleates.

The ester compounds with a long-chain alcohol radical, especially components (II) and (III), can be obtained, for example, by reacting (meth)acrylates, fumarates, maleates and/or the corresponding acids with long-chain fatty alcohols, which generally gives a mixture of esters, for example (meth)acrylates with different long-chain alcohol radicals. These fatty alcohols include Oxo Alcohol® 7911, Oxo Alcohol® 7900, Oxo Alcohol® 1100; Alfol® 610, Alfol® 810, Lial® 125 and Nafol® types (Sasol); Alphanol® 79 (ICI); Epal® 610 and Epal® 810 (Afton); Linevol® 79, Linevol® 911 and Neodol® 25E (Shell); Dehydad®, Hydrenol® and Lorol® types (Cognis); Acropol® 35 and Exxal® 10 (Exxon Chemicals); Kalcol® 2465 (Kao Chemicals).

Among the ethylenically unsaturated ester compounds, the (meth)acrylates are particularly preferred over the maleates and fumarates, i.e. R2, R3, R5, R6, R8 and R9 of the formulae (I), (II) and (III) are each hydrogen in particularly preferred embodiments.

The weight ratio of ester monomers of the formula (II) to the ester monomers of the formula (III) may be within a wide range. The ratio of ester compounds of the formula (II) which have 7 to 15 carbon atoms in the alcohol radical to the ester compounds of the formula (III) which have 16 to 40 carbon atoms in the alcohol radical is preferably in the range from 50:1 to 1:30, more preferably in the range from 10:1 to 1:3, especially preferably 5:1 to 1:1.

In addition, the monomer mixture for preparing the nonpolar segments may comprise ethylenically unsaturated monomers which can be copolymerized with the ethylenically unsaturated ester compounds of the formulae (I), (II) and/or (III).

Particularly suitable comonomers for polymerization according to the present invention are those which correspond to the formula:

in which $R^{1*}$ and $R^{2*}$ are each independently selected from the group consisting of hydrogen, halogens, CN, linear or branched alkyl groups having 1 to 20, preferably 1 to 6 and more preferably 1 to 4 carbon atoms, which may be substituted by 1 to (2n+1) halogen atoms, where n is the number of carbon atoms of the alkyl group (for example $CF_3$), α,β-unsaturated linear or branched alkenyl or alkynyl groups having 2 to 10, preferably 2 to 6 and more preferably 2 to 4 carbon atoms, which may be substituted by 1 to (2n−1) halogen atoms, preferably chlorine, where n is the number of carbon atoms of the alkyl group, for example $CH_2$=CCl—, cycloalkyl groups having 3 to 8 carbon atoms, which may be substituted by 1 to (2n−1) halogen atoms, preferably chlorine, where n is the number of carbon atoms of the cycloalkyl group; C(=Y*)$R^{5*}$, C(=Y*)$NR^{6*}R^{7*}$, Y*C(=Y*)$R^{5*}$, $SOR^{5*}$, $SO_2R^{5*}$, $OSO_2R^{5*}$, $NR^{8*}SO_2R^{5*}$, $PR^{5*}_2$, P(=Y*)$R^{5*}_2$, Y*$PR^{5*}_2$, Y*P(=Y*)$R^{5*}_2$, $NR^{8*}_2$ which may be quaternized with an additional $R^{8*}$, aryl or heterocyclyl group, where Y* may be $NR^{8*}$, S or O, preferably O; $R^{5*}$ is an alkyl group having 1 to 20 carbon atoms, an alkylthio having 1 to 20 carbon atoms, $OR^{15}$ ($R^{15}$ is hydrogen or an alkali metal), alkoxy of 1 to 20 carbon atoms, aryloxy or heterocyclyloxy; $R^{6*}$ and $R^{7*}$ are each independently hydrogen or an alkyl group having 1 to 20 carbon atoms, or $R^{6*}$ and $R^{7*}$ together may form an alkylene group having 2 to 7 and preferably 2 to 5 carbon atoms, in which case they form a 3- to 8-membered and preferably 3- to 6-membered ring, and $R^{8*}$ is hydrogen, linear or branched alkyl or aryl groups having 1 to 20 carbon atoms;

$R^{3*}$ and $R^{4*}$ are independently selected from the group consisting of hydrogen, halogen (preferably fluorine or chlorine), alkyl groups having 1 to 6 carbon atoms and $COOR^{9*}$ in which $R^{9*}$ is hydrogen, an alkali metal or an alkyl group having 1 to 40 carbon atoms, or $R^{1*}$ and $R^{3*}$ together may form a group of the formula $(CH_2)_{n'}$ which may be substituted by 1 to 2n' halogen atoms or $C_1$ to $C_4$ alkyl groups, or form the formula C(=O)—Y*—C(=O) where n' is 2 to 6, preferably 3 or 4, and Y* is as defined above; and where at least 2 of the $R^{1*}$, $R^{2*}$, $R^{3*}$ and $R^{4*}$ radicals are hydrogen or halogen.

The preferred comonomers include
vinyl halides, for example vinyl chloride, vinyl fluoride, vinylidene chloride and vinylidene fluoride;
styrene, substituted styrenes having an alkyl substituent in the side chain, for example α-methylstyrene and α-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes;
vinyl and isoprenyl ethers;
maleic acid and maleic acid derivatives different from those mentioned under (I), (II) and (III), for example maleic anhydride, methylmaleic anhydride, maleimide, methylmaleimide;
fumaric acid and fumaric acid derivatives different from those mentioned under (I), (II) and (III).

In addition, monomer mixtures for preparing the nonpolar segments may comprise dispersing monomers.

The proportion of comonomers is preferably 0 to 50% by weight, more preferably 0.1 to 40% by weight and most preferably 0.5 to 20% by weight, based on the weight of the monomer composition for preparing the nonpolar segment P.

In addition to the nonpolar segment P, a polymer usable in accordance with the invention comprises at least one polar segment D which comprises repeat units derived from dispersing monomers.

Dispersing monomers have been used for some time for functionalizing polymeric additives in lubricant oils, and are therefore known to those skilled in the art (cf. R. M. Mortier, S. T. Orszulik (eds.): "Chemistry and Technology of Lubricants", Blackie Academic & Professional, London, $2^{nd}$ ed. 1997). Appropriately, it is possible to use especially heterocyclic vinyl compounds and/or ethylenically unsaturated, polar ester compounds of the formula (IV)

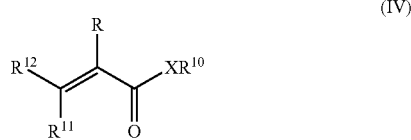

(IV)

in which R is hydrogen or methyl, X is oxygen, sulfur or an amino group of the formula —NH— or —NR$^a$— in which R$^a$ is an alkyl radical having 1 to 40 and preferably 1 to 4 carbon atoms, R$^{10}$ is a radical which comprises 2 to 1000, especially 2 to 100 and preferably 2 to 20 carbon atoms and has at least one heteroatom, preferably at least two heteroatoms, R$^{11}$ and R$^{12}$ are each independently hydrogen or a group of the formula —COX'R$^{10'}$ in which X' is oxygen or an amino group of the formula —NH— or —NR$^{a'}$— in which R$^{a'}$ is an alkyl radical having 1 to 40 and preferably 1 to 4 carbon atoms, and R$^{10'}$ is a radical comprising 1 to 100, preferably 1 to 30 and more preferably 1 to 15 carbon atoms, as dispersing monomers.

The expression "radical comprising 2 to 1000 carbon" denotes radicals of organic compounds having 2 to 1000 carbon atoms. Similar definitions apply for corresponding terms. It encompasses aromatic and heteroaromatic groups, and alkyl, cycloalkyl, alkoxy, cycloalkoxy, alkenyl, alkanoyl, alkoxycarbonyl groups, and also heteroaliphatic groups. The groups mentioned may be branched or unbranched. In addition, these groups may have customary substituents. Substituents are, for example, linear and branched alkyl groups having 1 to 6 carbon atoms, for example methyl, ethyl, propyl, butyl, pentyl, 2-methylbutyl or hexyl; cycloalkyl groups, for example cyclopentyl and cyclohexyl; aromatic groups such as phenyl or naphthyl; amino groups, hydroxyl groups, ether groups, ester groups and halides.

According to the invention, aromatic groups denote radicals of mono- or polycyclic aromatic compounds having preferably 6 to 20 and especially 6 to 12 carbon atoms. Heteroaromatic groups denote aryl radicals in which at least one CH group has been replaced by N and/or at least two adjacent CH groups have been replaced by S, NH or O, heteroaromatic groups having 3 to 19 carbon atoms.

Aromatic or heteroaromatic groups preferred in accordance with the invention derive from benzene, naphthalene, biphenyl, diphenyl ether, diphenylmethane, diphenyldimethylmethane, bisphenone, diphenyl sulfone, thiophene, furan, pyrrole, thiazole, oxazole, imidazole, isothiazole, isoxazole, pyrazole, 1,3,4-oxa-diazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzoxathiadiazole, benzoxadiazole, benzopyridine, benzopyrazine, benzopyrazidine, benzopyrimidine, benzotriazine, indolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, each of which may also optionally be substituted.

The preferred alkyl groups include the methyl, ethyl, propyl, isopropyl, 1-butyl, 2-butyl, 2-methylpropyl, tert-butyl radical, pentyl, 2-methylbutyl, 1,1-dimethylpropyl, hexyl, heptyl, octyl, 1,1,3,3-tetramethylbutyl, nonyl, 1-decyl, 2-decyl, undecyl, dodecyl, pentadecyl and the eicosyl group.

The preferred cycloalkyl groups include the cyclopropyl, cyclobutyl, cyclopentyl, cyclohexyl, cycloheptyl and the cyclooctyl group, each of which is optionally substituted with branched or unbranched alkyl groups.

The preferred alkanoyl groups include the formyl, acetyl, propionyl, 2-methylpropionyl, butyryl, valeroyl, pivaloyl, hexanoyl, decanoyl and the dodecanoyl group.

The preferred alkoxycarbonyl groups include the methoxycarbonyl, ethoxycarbonyl, propoxycarbonyl, butoxycarbonyl, tert-butoxycarbonyl, hexyloxycarbonyl, 2-methylhexyloxycarbonyl, decyloxycarbonyl or dodecyloxycarbonyl group.

The preferred alkoxy groups include alkoxy groups whose hydrocarbon radical is one of the aforementioned preferred alkyl groups.

The preferred cycloalkoxy groups include cycloalkoxy groups whose hydrocarbon radical is one of the aforementioned preferred cycloalkyl groups.

The preferred heteroatoms which are present in the R$^{10}$ radical include oxygen, nitrogen, sulfur, boron, silicon and phosphorus, preference being given to oxygen and nitrogen.

The R$^{10}$ radical comprises at least one, preferably at least two, preferentially at least three, heteroatoms.

The R$^{10}$ radical in ester compounds of the formula (IV) preferably has at least 2 different heteroatoms. In this case, the R$^{10}$ radical in at least one of the ester compounds of the formula (IV) may comprise at least one nitrogen atom and at least one oxygen atom.

Examples of ethylenically unsaturated, polar ester compounds of the formula (IV) include aminoalkyl (meth)acrylates, aminoalkyl (meth)acrylamides, hydroxyalkyl (meth)acrylates, heterocyclic (meth)acrylates and/or carbonyl-containing (meth)acrylates.

The hydroxyalkyl (meth)acrylates include
2-hydroxypropyl (meth)acrylate,
3,4-dihydroxybutyl (meth)acrylate,
2-hydroxyethyl (meth)acrylate,
3-hydroxypropyl (meth)acrylate,
2,5-dimethyl-1,6-hexanediol (meth)acrylate and
1,10-decanediol (meth)acrylate.

Appropriate carbonyl-containing (meth)acrylates include, for example,
2-carboxyethyl (meth)acrylate,
carboxymethyl (meth)acrylate,
oxazolidinylethyl (meth)acrylate, N-(methacryloyloxy)formamide,
acetonyl (meth)acrylate,
mono-2-(meth)acryloyloxyethyl succinate,
N-(meth)acryloylmorpholine,
N-(meth)acryloyl-2-pyrrolidinone,
N-(2-(meth)acryloyloxyethyl)-2-pyrrolidinone,
N-(3-(meth)acryloyloxypropyl)-2-pyrrolidinone,
N-(2-(meth)acryloyloxypentadecyl)-2-pyrrolidinone,
N-(3-(meth)acryloyloxyheptadecyl)-2-pyrrolidinone and
N-(2-(meth)acryloyloxyethyl)ethyleneurea.
2-Acetoacetoxyethyl (meth)acrylate The heterocyclic (meth)acrylates include
2-(1-imidazolyl)ethyl (meth)acrylate, 2-(4-morpholinyl) ethyl (meth)acrylate and
1-(2-(meth)acryloyloxyethyl)-2-pyrrolidone.

Of particular interest are additionally aminoalkyl (meth) acrylates and aminoalkyl
(meth)acrylatamides, for example
dimethylaminopropyl (meth)acrylate,
dimethylaminodiglykol (meth)acrylate,
dimethylaminoethyl (meth)acrylate,
dimethylaminopropyl(meth)acrylamide,
3-diethylaminopentyl (meth)acrylate and
3-dibutylaminohexadecyl (meth)acrylate.

In addition, it is possible to use phosphorus-, boron- and/or silicon-containing (meth)acrylates to prepare the polar segments D, such as
2-(dimethylphosphato)propyl (meth)acrylate,
2-(ethylenephosphito)propyl (meth)acrylate,
dimethylphosphinomethyl (meth)acrylate,
dimethylphosphonoethyl (meth)acrylate,
diethyl(meth)acryloyl phosphonate,
dipropyl(meth)acryloyl phosphate, 2-(dibutylphosphono) ethyl (meth)acrylate,
2,3-butylene(meth)acryloylethyl borate,
methyldiethoxy(meth)acryloylethoxysilane,
diethylphosphatoethyl (meth)acrylate.

The preferred heterocyclic vinyl compounds include 2-vinylpyridine, 3-vinylpyridine, 2-methyl-5-vinylpyridine, 3-ethyl-4-vinylpyridine, 2,3 dimethyl-5-vinylpyridine, vinylpyrimidine, vinylpiperidine, 9-vinylcarbazole, 3-vinylcarbazole, 4-vinylcarbazole, 1-vinylimidazole, N-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinyithiolane, vinylthiazoles and hydrogenated vinylthiazoles, vinyloxazoles and hydrogenated vinyloxazoles, particular preference being given to using N-vinylimidazole and N-vinylpyrrolidone for functionalization.

The monomers detailed above can be used individually or as a mixture.

Of particular interest are especially polymers which comprise ester groups and are obtained using 2-hydroxypropyl methacrylate, 2-hydroxyethyl methacrylate, mono-2-methacryloyloxyethyl succinate, N-(2-methacryloyloxyethyl)ethyleneurea, 2-acetoacetoxyethyl methacrylate, 2-(4-morpholinyl)ethyl methacrylate, dimethylaminodiglycol methacrylate, dimethylaminoethyl methacrylate and/or dimethylaminopropylmethacrylamide.

In addition to the dispersing monomers, a composition for preparing the polar segments may also comprise non-dispersing monomers which have been detailed above. These include especially ethylenically unsaturated ester compounds of the formulae (I), (II) and/or (III).

Of particular interest are especially polymeric additives having a polar segment D which comprises at least 3 and preferably at least 5 units derived from monomers of the formula (IV) and/or from heterocyclic vinyl compounds, which are bonded directly to one another.

Appropriately, the weight ratio of the hydrophobic segments to the polar segments may be in the range from 100:1 to 1:1, more preferably in the range from 30:1 to 2:1 and most preferably in the range from 10:1 to 4:1.

The length of the hydrophobic and polar segments may vary within wide ranges. The nonpolar segments P preferably possess a weight-average degree of polymerization of at least 10, especially at least 40. The weight-average degree of polymerization of the hydrophobic segments is preferably in the range from 20 to 5000, especially from 50 to 2000.

The proportion of dispersing repeat units, based on the weight of the polymers comprising ester groups, is preferably in the range from 0.5% by weight to 20% by weight, more preferably in the range from 1.5% by weight to 15% by weight and most preferably in the range from 2.5% by weight to 10% by weight. At the same time, these repeat units preferably form a segment-like structure within the polymer comprising ester groups, such that preferably at least 70% by weight, more preferably at least 80% by weight, based on the total weight of the dispersing repeat units, are part of a polar segment D.

The present invention describes polymers which preferably have a high oil solubility. The term "oil-soluble" means that a mixture of a base oil and a polymer comprising ester groups is preparable without macroscopic phase formation, which has at least 0.1% by weight, preferably at least 0.5% by weight, of the polymers. The polymer may be present in dispersed and/or dissolved form in this mixture. The oil solubility depends especially on the proportion of the lipophilic side chains and on the base oil. This property is known to those skilled in the art and can be adjusted readily for the particular base oil via the proportion of lipophilic monomers.

Of particular interest, among others, are polymers which comprise ester groups and preferably have a weight-average molecular weight $M_w$ in the range from 7500 to 1 000 000 g/mol, more preferably 10 000 to 600 000 g/mol and most preferably 15 000 to 80 000 g/mol.

The number-average molecular weight $M_n$ may preferably be in the range from 5000 to 800 000 g/mol, more preferably 7500 to 500 000 g/mol and most preferably 10 000 to 80 000 g/mol.

Additionally appropriate are polymers which comprise ester groups and whose polydispersity index $M_w/M_n$ is in the range from 1 to 5, more preferably in the range from 1.05 to 4. The number-average and weight-average molecular weights can be determined by known processes, for example gel permeation chromatography (GPC).

The polymer comprising ester groups may have a variety of structures. For example, the polymer may be present as a diblock, triblock, multiblock, comb and/or star copolymer which has corresponding polar and nonpolar segments. In addition, the polymer may especially be present as a graft copolymer.

The polymers comprising ester groups for use in accordance with the invention can be obtained in various ways. It is essential that at least one nonpolar segment P and at least one polar segment D are prepared. A preferred process consists in free-radical graft copolymerization which is known per se, wherein, for example, a nonpolar graft base is obtained in a first step, onto which dispersing monomers are grafted in a second step.

Block copolymers which comprise nonpolar segments P and polar segments D can be obtained especially by means of controlled free-radical polymerization processes, for example ATRP (=Atom Transfer Radical Polymerization), RAFT (=Reversible Addition Fragmentation Chain Transfer) or NMP (=Nitroxide Mediated Polymerization). These methods are described comprehensively, more particularly with further references, inter alia, in K. Matyjaszewski, T. P. Davis, Handbook of Radical Polymerization, Wiley Interscience, Hoboken 2002, to which explicit reference is made for the purposes of disclosure.

The processes detailed above for controlled free-radical polymerization can be used to obtain especially diblock, triblock, multiblock, comb or star copolymers. Customary free-radical polymerization, which is especially suitable for preparing graft copolymers, is detailed in K. Matyjaszewski, T. P. Davis, Handbook of Radical Polymerization, Wiley Interscience, Hoboken 2002. In general, a polymerization initiator and a chain transferer are used for that purpose.

The usable initiators include the azo initiators widely known in the technical field, such as AIBN and 1,1-azobiscyclohexanecarbonitrile, and also peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropyl-carbonate, 2,5-bis (2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis (4-tert-butylcyclohexyl)peroxydicarbonate, mixtures of two or more of the aforementioned compounds with one another, and mixtures of the aforementioned compounds with compounds which have not been mentioned but can likewise form free radicals. Suitable chain transferers are in particular oil-soluble mercaptans, for example n-dodecyl mercaptan or 2-mercaptoethanol, or else chain transferers from the class of the terpenes, for example terpinolene.

The ATRP process is known per se. It is assumed that it is a "living" free-radical polymerization, without any intention that the description of the mechanism should impose a restriction. In these processes, a transition metal compound is reacted with a compound which has a transferable atom group. This transfers the transferable atom group to the transition metal compound, which oxidizes the metal. This reaction forms a radical which adds onto ethylenic groups. However, the transfer of the atom group to the transition metal compound is reversible, so that the atom group is transferred back to the growing polymer chain, which forms a controlled polymerization system. The structure of the polymer, the molecular weight and the molecular weight distribution can be controlled correspondingly.

This reaction is described, for example, by J-S. Wang, et al., J. Am. Chem. Soc., vol. 117, p. 5614-5615 (1995), by Matyjaszewski, Macromolecules, vol. 28, p. 7901-7910 (1995). In addition, the patent applications WO 96/30421, WO 97/47661, WO 97/18247, WO 98/40415 and WO 99/10387 disclose variants of the ATRP explained above.

In addition, the inventive polymers may be obtained, for example, also via RAFT methods. This process is presented in detail, for example, in WO 98/01478 and WO 2004/083169, to which reference is made explicitly for the purposes of disclosure.

In addition, the inventive polymers are obtainable by NMP processes, which are described, inter alia, in U.S. Pat. No. 4,581,429.

The polymerization may be carried out at standard pressure, reduced pressure or elevated pressure. The polymerization temperature too is uncritical. However, it is generally in the range of −20°-200° C., preferably 50°-150° C. and more preferably 80°-130° C.

The polymerization may be carried out with or without solvent. The term solvent is to be understood here in a broad sense. The solvent is selected according to the polarity of the monomers used, preference being given to using 100N oil, relatively light gas oil and/or aromatic hydrocarbons, for example toluene or xylene.

The lubricant oils include especially mineral oils, synthetic oils and natural oils.

Mineral oils are known per se and commercially available. They are generally obtained from mineral oil or crude oil by distillation and/or refining and optionally further purification and finishing processes, the term mineral oil including in particular the higher-boiling fractions of crude or mineral oil. In general, the boiling point of mineral oil is higher than 200° C., preferably higher than 300° C., at 5000 Pa. The production by low-temperature carbonization of shale oil, coking of bituminous coal, distillation of brown coal with exclusion of air, and also hydrogenation of bituminous or brown coal is likewise possible. Accordingly, mineral oils have, depending on their origin, different proportions of aromatic, cyclic, branched and linear hydrocarbons.

In general, a distinction is drawn between paraffin-base, naphthenic and aromatic fractions in crude oils or mineral oils, in which the term paraffin-base fraction represents longer-chain or highly branched isoalkanes, and naphthenic fraction represents cycloalkanes. In addition, mineral oils, depending on their origin and finishing, have different fractions of n-alkanes, isoalkanes having a low degree of branching, known as mono-methyl-branched paraffins, and compounds having heteroatoms, in particular O, N and/or S, to which a degree of polar properties are attributed. However, the assignment is difficult, since individual alkane molecules may have both long-chain branched groups and cycloalkane radicals, and aromatic parts. For the purposes of the present invention, the assignment can be effected to DIN 51 378, for example. Polar fractions can also be determined to ASTM D 2007.

The proportion of n-alkanes in preferred mineral oils is less than 3% by weight, the fraction of O-, N- and/or S-containing compounds less than 6% by weight. The fraction of the aromatics and of the mono-methyl-branched paraffins is generally in each case in the range from 0 to 40% by weight. In one interesting aspect, mineral oil comprises mainly naphthenic and paraffin-base alkanes which have generally more than 13, preferably more than 18 and most preferably more than 20 carbon atoms. The fraction of these compounds is generally ≥60% by weight, preferably ≥80% by weight, without any intention that this should impose a restriction. A preferred mineral oil contains 0.5 to 30% by weight of aromatic fractions, 15 to 40% by weight of naphthenic fractions, 35 to 80% by weight of paraffin-base fractions, up to 3% by weight of n-alkanes and 0.05 to 5% by weight of polar compounds, based in each case on the total weight of the mineral oil.

An analysis of particularly preferred mineral oils, which was effected by means of conventional processes such as urea separation and liquid chromatography on silica gel, shows, for example, the following constituents, the percentages relating to the total weight of the particular mineral oil used:
n-alkanes having approx. 18 to 31 carbon atoms:
0.7-1.0%,
slightly branched alkanes having 18 to 31 carbon atoms:
1.0-8.0%,
aromatics having 14 to 32 carbon atoms:
0.4-10.7%, iso- and cycloalkanes having 20 to 32 carbon atoms:
60.7-82.4%,
polar compounds:
0.1-0.8%,
loss:
6.9-19.4%.

An improved class of mineral oils (reduced sulfur content, reduced nitrogen content, higher viscosity index, lower pour point) results from hydrogen treatment of the mineral oils (hydroisomerization, hydrocracking, hydrotreatment, hydrofinishing). In the presence of hydrogen, this essentially reduces aromatic components and builds up naphthenic components.

Valuable information with regard to the analysis of mineral oils and a list of mineral oils which have a different composition can be found, for example, in T. Mang, W. Dresel (eds.): "Lubricants and Lubrication", Wiley-VCH, Weinheim 2001; R. M. Mortier, S. T. Orszulik (eds.): "Chemistry and Technology of Lubricants", Blackie Academic & Professional, London, $2^{nd}$ ed. 1997; or J. Bartz: "Additive für Schmierstoffe", Expert-Verlag, Renningen-Malmsheim 1994.

Synthetic oils include organic esters, for example diesters and polyesters, polyalkylene glycols, polyethers, synthetic hydrocarbons, especially polyolefins, among which preference is given to polyalphaolefins (PAOs), silicone oils and perfluoroalkyl ethers. In addition, it is possible to use synthetic base oils originating from gas to liquid (GTL), coal to liquid (CTL) or biomass to liquid (BTL) processes. They are usually somewhat more expensive than the mineral oils, but have advantages with regard to their performance.

Natural oils are animal or vegetable oils, for example neatsfoot oils or jojoba oils.

Base oils for lubricant oil formulations are divided into groups according to API (American Petroleum Institute). Mineral oils are divided into group I (non-hydrogen-treated) and, depending on the degree of saturation, sulfur content and viscosity index, into groups III and III (both hydrogen-treated). PAOs correspond to group IV. All other base oils are encompassed in group V.

These lubricant oils may also be used as mixtures and are in many cases commercially available.

The concentration of the polymers comprising ester groups in the lubricant oil composition is preferably in the range of 0.01 to 30% by weight, more preferably in the range of 0.1-20% by weight and most preferably in the range of 0.5-10% by weight, based on the total weight of the composition.

In addition to the polymers comprising ester groups for use in accordance with the invention, the lubricant oil compositions detailed here may also comprise further additives. These additives include VI improvers, pour point improvers and DI additives (dispersants, detergents, defoamers, corrosion inhibitors, antioxidants, antiwear and extreme pressure additives, friction modifiers).

The additionally usable VI improvers include especially polyalkyl (meth)acrylates having 1 to 30 carbon atoms in the alcohol group (PAMA; partly N/O-functional with advantageous additional properties as dispersants, antiwear additives and/or friction modifiers), which differ from the copolymers detailed in claim 1, and poly(iso)butenes (PIB), fumarate-olefin copolymers, styrene-maleate copolymers, hydrogenated styrene-diene copolymers (HSD) and olefin copolymers (OCP).

The pour point improvers include especially polyalkyl (meth)acrylates (PAMA) having 1 to 30 carbon atoms in the alcohol group.

Compilations of VI improvers and pour point improvers for lubricant oils are also detailed in T. Mang, W. Dresel (eds.): "Lubricants and Lubrication", Wiley-VCH, Weinheim 2001: R. M. Mortier, S. T. Orszulik (eds.): "Chemistry and Technology of Lubricants", Blackie Academic & Professional, London, 2nd ed. 1997; or J. Bartz: "Additive für Schmierstoffe", Expert-Verlag, Renningen-Malmsheim 1994.

Appropriate dispersants include poly(isobutylene) derivatives, e.g. poly(isobutylene)succinimides (PIBSIs); ethylene-propylene oligomers with N/O functionalities.

The preferred detergents include metal-containing compounds, for example phenoxides; salicylates; thiophosphonates, especially thiopyrophosphonates, thiophosphonates and phosphonates; sulfonates and carbonates. As metals, these compounds may comprise especially calcium, magnesium and barium. These compounds may be used preferably in neutral or overbased form.

Of particular interest are additionally defoamers, which are in many cases divided into silicone-containing and silicone-free defoamers. The silicone-containing defoamers include linear poly(dimethylsiloxane) and cyclic poly(dimethylsiloxane). The silicone-free defoamers which may be used are in many cases polyethers, for example poly(ethylene glycol) or tributyl phosphate.

In a particular embodiment, the inventive lubricant oil compositions may comprise corrosion inhibitors. These are in many cases divided into antirust additives and metal passivators/deactivators. The antirust additives used may, inter alia, be sulfonates, for example petroleumsulfonates or (in many cases overbased) synthetic alkylbenzenesulfonates, e.g. dinonylnaphthenesulfonates; carboxylic acid derivatives, for example lanolin (wool fat), oxidized paraffins, zinc naphthenates, alkylated succinic acids, 4-nonylphenoxy-acetic acid, amides and imides (N-acylsarcosine, imidazoline derivatives); amine-neutralized mono- and dialkyl phosphates; morpholine, dicyclohexylamine or diethanolamine. The metal passivators/deactivators include benzotriazole, tolyltriazole, 2-mercaptobenzothiazole, dialkyl-2,5-dimercapto-1,3,4-thiadiazole; N,N'-disalicylideneethylenediamine, N,N'-disalicylidenepropylenediamine, zinc dialkyldithiophosphates and dialkyl dithiocarbamates.

A further preferred group of additives is that of antioxidants. The antioxidants include, for example, phenols, for example 2,6-di-tert-butylphenol (2,6-DTB), butylated hydroxytoluene (BHT), 2,6-di-tert-butyl-4-methylphenol, 4,4'-methylenebis(2,6-di-tert-butylphenol); aromatic amines, especially alkylated diphenylamines, N-phenyl-1-naphthylamine (PNA), polymeric 2,2,4-trimethyldihydroquinone (TMQ); compounds containing sulfur and phosphorus, for example metal dithiophosphates, e.g. zinc dithiophosphates (ZnDTP), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc and methylene bis(dialkyldithiocarbamate); organophosphorus compounds, for example triaryl and trialkyl phosphites; organocopper compounds and overbased calcium- and magnesium-based phenolates and salicylates.

The preferred antiwear (AW) and extreme pressure (EP) additives include phosphorus compounds, for example trialkyl phosphates, triaryl phosphates, e.g. tricresyl phosphate, amine-neutralized mono- and dialkyl phosphates, ethoxylated mono- and dialkyl phosphates, phosphites, phosphonates, phosphines; compounds containing sulfur and phosphorus, for example metal dithiophosphates, e.g. zinc $C_{3-12}$dialkyldithiophosphates (ZnDTPs), ammonium dialkyldithiophosphates, antimony dialkyldithiophosphates, molybdenum dialkyldithiophosphates, lead dialkyldithiophosphates, "OOS triesters"=reaction products of dithiophosphoric acid with activated double bonds from olefins, cyclopentadiene, norbornadiene, α-pinene, polybutene, acrylic esters, maleic esters, triphenylphosphorothionate (TPPT); compounds containing sulfur and nitrogen, for example zinc bis(amyl dithiocarbamate) or methylenebis(di-n-butyl dithiocarbamate); sulfur compounds containing elemental sulfur and $H_2S$-sulfurized hydrocarbons (diisobutylene, terpene); sulfurized glycerides and fatty acid esters; overbased sulfonates; chlorine compounds or solids such as graphite or molybdenum disulfide.

A further preferred group of additives is that of friction modifiers. The friction modifiers used may include mechanically active compounds, for example molybdenum disulfide, graphite (including fluorinated graphite), poly(trifluoroethylene), polyamide, polyimide; compounds which form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds which form polymer-like layers, for example ethoxylated dicarboxylic acid partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTC) and their combinations with ZnDTPs, copper-containing organic compounds.

Some of the additives detailed above may fulfill multiple functions. ZnDTP, for example, is primarily an antiwear additive and extreme pressure additive, but also has the character of an antioxidant and corrosion inhibitor (here: metal passivator/deactivator).

The additives detailed above are described in more detail, inter alia, in T. Mang, W. Dresel (eds.): "Lubricants and Lubrication", Wiley-VCH, Weinheim 2001; J. Bartz: "Additive für Schmierstoffe", Expert-Verlag, Renningen-Malmsheim 1994; R. M. Mortier, S. T. Orszulik (eds.): "Chemistry and Technology of Lubricants", Blackie Academic & Professional, London, $2^{nd}$ ed. 1997.

Preferred lubricant oil compositions have a viscosity, measured at 40° C. to ASTM D 445, in the range of 10 to 120 $mm^2/s$, more preferably in the range of 20 to 100 $mm^2/s$. The kinematic viscosity $KV_{100}$ measured at 100° C. is preferably at least 5.0 $mm^2/s$, more preferably at least 5.2 $mm^2/s$ and most preferably at least 5.4 $mm^2/s$.

In a particular aspect of the present invention, preferred lubricant oil compositions have a viscosity index determined to ASTM D 2270 in the range of 100 to 400, more preferably in the range of 125 to 325 and most preferably in the range of 150 to 250.

Appropriate lubricants have a PSSI to DIN 51350-6 (20 h, tapered roller bearing) less than or equal to 100. The PSSI is more preferably less than or equal to 65, especially preferably less than or equal to 25.

The present lubricants can be used especially as a transmission oil, motor oil or hydraulic oil. Surprising advantages can be achieved especially when the present lubricants are used in manual, automated manual, double clutch or direct-shift gearboxes (DSG), automatic and continuous variable transmissions (CVCs). In addition, the present lubricants can be used especially in transfer cases and axle or differential gearings.

The present polymers comprising ester groups serve especially as antifatigue additives in lubricants. It has been found that, surprisingly, these additives counteract material fatigue, such that the lifetime of transmissions, engines or hydraulic systems can be increased. This finding can be established by various methods. The fatigue time (crater resistance) of the lubricant oil formulations can be determined either by methods for gearings or for roller bearings. The methods which follow cover a wide range of Hertzian pressures.

The fatigue time (number of rotations) can be determined, for example, on a standardized four-ball apparatus (FBA) to DIN 51350-1, in which a rotating ball under load is pressed onto three identical, likewise rotating balls. The test method employed is VW-PV-1444 of Volkswagen AG ("Grübchenfestigkeit von Bauteilen mit Wälzreibung—Pittingtest" [Crater resistance of components with rolling friction—pitting test], VW-PV-1444, Volkswagen AG).

The test temperature is 120° C. With a load of 4.8 kN and a rotational speed of 4000 rpm, the entrainment speed is 5.684 m/s at a maximum Hertzian pressure of 7.67 GPa. Fatigue occurs as soon as an acceleration sensor registers vibrations in the frequency band of the rollover frequencies of the test bodies greater than 0.25 g (acceleration due to gravity g=9.81 $m/s^2$). This typically indicates craters on the rolling path of diameter 1-2 mm. This test is referred to hereinafter as the FBA test.

In addition, fatigue can be determined by means of an FAG FE8 test. To this end, the FE8 roller bearing lubricant test rig to DIN 51819-1 from FAG (Schaeffler KG, Schweinfurt) can be used. Here, the fatigue time (in hours) of two cylindrical roller thrust bearings mounted together in each case is examined according to test method VW-PV-1483 ("Prüfung der Grübchentragfähigkeit in Wälzlagern—Ermüdungstest" [Testing of crater resistance in roller bearings—fatigue test], VW-PV-1483, Volkswagen AG, drafted September 2006; constituent of oil standards VW TL52512/2005 for manual transmissions and VW TL52182/2005 for double-clutch transmissions of Volkswagen AG). Bearing washers with an arithmetic roughness of 0.1-0.3 μm are used.

Measurement is effected at 120° C. with a load of 60 kN and a rotational speed of 500 rpm, the entrainment speed is 1.885 m/s at a maximum Hertzian pressure of 1.445 GPa. Fatigue occurs as soon as the torque (i.e. the moment of friction) has an increase by more than 10%, i.e. even in the case of fatigue only to one cylindrical roller thrust bearing.

In principle, the FE8 roller bearing lubricant test rig can also be operated according to the more severe ZF-702-232/ 2003 method of ZF Friedrichshafen AG (cf. "ZF Bearing Pitting Test", ZF-702-232, ZF Friedrichshafen AG, 2004).

The Unisteel Machine according to IP 305/79 based on a roller bearing with 11 balls (in modifications also only with 3 balls), which is widespread in industry, offers a method of determining the fatigue time of bearings.

In addition, it is possible to use a gear rig test machine from FZG (Institute for Machine Elements—Gear Research Center of the Technical University of Munich) to DIN 51354-1. On this test machine, the fatigue time (in hours) is determined using specified PT-C (pitting test type C) gears. The method is described in FVA Information Sheet 2/IV (cf. U. Schedl: "FVA-Forschungsvorhaben 2/IV: Pittingtest—Einfluss der Schmierstoffs auf die Grübchenlebensdauer einsatzgehärteter Zahnräder im Einstufen- und Lastkollektivversuch", Forschungsvereinigung Antriebstechnik, Book 530, Frankfurt 1997; "Pittingtest—Einfluss der Schmierstoffs auf die Grübchenlebensdauer einsatzgehärteter Zahnräder im Einstufen- und Lastkollektivversuch", FVA Information Sheet 2/IV, Forschungsvereinigung Antriebstechnik, Frankfurt 1997).

Measurement is effected at 120° C. At load level 10 (i.e. a torque of 373 Nm) and a rotational speed of 1450 rpm, the entrainment speed is 5.678 m/s at a maximum Hertzian pressure of 1.834 GPa. Fatigue occurs when craters of total area$>=5$ mm$^2$ are observed. This method is referred to hereinafter as FZG PT-C 10/120 test.

The utilization of the further-developed PT$\underline{X}$-C test gearing, which is close to reality, in the FZG gear rig test machine to DIN 51354-1 leads to improved repeatability and comparability of the fatigue time. The method is described in FVA Information Sheet 371 (cf. T. Radev: "FVA-Forschungsvorhaben 371: Entwicklung eines praxisnahen Pittingtests", Forschungsvereinigung Antriebstechnik, Book 710, Frankfurt 2003; "Development of a Practice Relevant Pitting Test", FVA Information Sheet 371, Forschungsvereinigung Antriebstechnik, Frankfurt 2006).

Measurement is effected at 90° C. At load level 10 (i.e. a torque of 373 Nm) and a rotational speed of 1450 rpm, the entrainment speed is 5.678 m/s at a maximum Hertzian pressure of 2.240 GPa. Fatigue occurs when craters of total area$>=5$ mm$^2$ are observed. This method is referred to hereinafter as FZG PTX-C 10/90 test.

The present invention will be illustrated in detail hereinafter with reference to examples and comparative examples, without any intention that this should impose a restriction.

PREPARATION EXAMPLES

Comparative Example 1

16.7 g of monomer mix (94% 12-15-alkyl methacrylate and 6% dimethylaminoethyl methacrylate) and 0.283 g of n-dodecyl mercaptan were filled together with 150 g of 100N oil into the 2 l reaction flask of an apparatus with saber stirrer, condenser, thermometer, feed pump and N$_2$ inlet. The apparatus was inertized and heated to 100° C. using an oil bath. Once the mixture in the reaction flask had reached a temperature of 100° C., 0.456 g of tert-butyl peroctoate was added.

At the same time the feed of a mixture of 833 g of monomer mix (94% 12-15-alkyl methacrylate and 6% dimethylaminoethyl methacrylate), 14.2 g of n-dodecyl mercaptan and 2.50 g of tert-butyl peroctoate by means of a pump was commenced. The addition proceeded homogeneously over a period of 3.5 h at 100° C.

2 h and 4 h after the end of feeding, another 1.70 g each time of tert-butyl peroctoate were added, and the mixture was stirred at 100° C. for a further 2 h. This gives virtually 1000 g of an 85% clear solution.

Example 1

First, the base polymer was prepared. 29.4 g of monomer mixture (75% 12/14-alkyl methacrylate and 25% methyl methacrylate) and 0.0883 g of n-dodecyl mercaptan were filled together with 265 g of 100N oil into the 2 l reaction flask of an apparatus with a saber stirrer, condenser, thermometer, feed pump and N$_2$ inlet. The apparatus was inertized and heated to 100° C. using an oil bath. Once the mixture in the reaction flask reached a temperature of 100° C., 2.26 g of tert-butyl peroctoate were added.

At the same time, the feed of a mixture of 706 g of monomer mixture (75% 12/14-alkyl methacrylate and 25% methyl methacrylate), 2.12 g of n-dodecyl mercaptan and 19.8 g of tert-butyl peroctoate by means of a pump was commenced. The addition proceeded homogeneously over a period of 3.5 h at 105° C. 2 h after the end of feeding, another 1.47 g each time of tert-butyl peroctoate were added at 105° C. This gave a 73.5% clear solution.

The resulting 1000 g of 73.5/26.5 mixture of base polymer/100N oil was admixed with 22.7 g of N-vinylpyrrolidone (NVP) and grafted at 130° C. with 1.89 g of tert-butyl perbenzoate. 1 h, 2 h and 3 h after the first addition, a further 0.947 g each time of tert-butyl perbenzoate was fed in at 130° C. After a further hour of stirring, the mixture is diluted again to 73.5% with 100N oil.

The graft yield was approx. 20%, measured via the signal height. The graft yield was determined by the method described in WO 2006/007934.

Example 2

An apparatus consisting of a 2 L reaction flask with a dropping funnel, saber stirrer, condenser, thermometer and N$_2$ inlet was used. First, 463 g of 12/14-alkyl methacrylate, 56 g of 100N oil, 1.5 g of CuCl and 2.7 g of pentamethylendiethylentriamine were initially charged in the reaction flask and inertized with stirring. A heterogeneous mixture was present, since the complexed catalyst is only incompletely soluble. During the heating operation, the reaction was started with 6.1 g of ethyl bromoisobutyrate at about 65° C.

After noticeable exothermicity, the mixture was allowed to react at 95° C. for 2 h.

At a conversion of at least 90% of initially used 12/14-alkyl methacrylate, 37.5 g of morpholinoethyl methacrylate were added dropwise within 5 min, and the mixture was left to react at 95° C. for a further 4 h. Subsequently, the mixture was diluted to 50% with 100N oil and pressure-filtered while warm to remove the CuCl (Seitz T1000 10 µm depth filter). This gave a 50% reddish solution.

Example 3

First, an 8-arm initiator was prepared. The 8-arm octa α-bromoisobutyryl)sucrose initiator was synthsized by a synthesis described in M. H. Stenzel-Rosenbaum, T. P. Davis, V. Chen, A. Fane, *Macromolecules* 34 (2001), 5433, in which a 72% yield was achieved. The structure was proved by means of $^1$H NMR. Analysis by MALDI-ToF-MS (Bruker Daltonics Reflex 3; 337 nm N$_2$ laser; acceleration voltage 20 kV; 2,5-dihydroxybenzoic acid/LiCl/8-arm initiator=10/1/1 wt %) shows 87 mol % with 8-fold functionalization (M+M$_{Li+}$= 1541 g/mol) and 13 mol % with 7-fold functionalization (M+M$_{Li+}$=1393 g/mol).

To synthesize the star polymer, an apparatus consisting of a 2 L reaction flask with dropping funnel, saber stirrer, condenser, thermometer and N$_2$ inlet was used. First, 450 g of 12/14-alkyl methacrylate, 500 g of i-octane, 0.6 g of CuCl, 0.01 g of CuBr$_2$, 20 g of octa(α-bromoisobutyryl)sucrose were initially charged in the reaction flask and inertized with stirring. During the heating operation, the reaction was started with 1.1 g of pentamethylenediethylenetriamine at about 60° C. A heterogeneous mixture was present, since the complexed catalyst is only incompletely soluble. After noticeable exothermicity, the mixture was left to react at 60° for 6 h, then at 70° C. for 6 h, then at 80° for 6 h.

At a conversion of at least 90% of initially used 12/14-alkyl methacrylate and after heating to 90° C., 50 g of dimethylaminoethyl methacrylate were added dropwise within 5 min, and the mixture was left to react at 90° C. for a further 40 h. It was stopped by adding 5 ml of a solution of 10 g/l CuBr$_2$, 10 g/l pentamethylenediethylenetriamine and 5 g/l Irganox® 1010 in i-octane. The mixture was pressure-filtered while warm through an $Al_2O_3$ column to remove the copper salts. The product was repeatedly digested in three times the volume of methanol and the methanol was decanted off. Finally, the methanol was drawn off. This gave a solvent-free rubber-like reddish polymer.

The mass-average molecular weights $M_w$ and polydispersity indices PDI of the polymers were determined by GPC, and the results are shown in the table. The measurements were effected in tetrahydrofuran at 35° C. against a polymethyl methacrylate calibration curve obtained from a set of ≥25 standards (Polymer Standards Service or Polymer Laboratories), the $M_{peak}$ of which was in a homogeneous logarithmic distribution over the range from $5·10^6$ to $2·10^2$ g/mol. A combination of six columns (Polymer Standards Service SDV 100 Å/2×SDV LXL/2×SDV 100 Å/Shodex KF-800D) is used. To record the signal, an RI detector (Agilent 1100 Series) is used.

For all polymers, owing to adsorptions of the strongly polar N/O-functional block structures, there is a shift toward somewhat lower apparent molecular weights $M_{w,apparent}$. On the other hand, for star polymers, the values measured $M_{w,apparent}$ are significantly higher than for linear PAMA of similar shear stability.

The molecular weight distributions of all block polymers and star block polymers prepared by ATRP were strictly monomodal. Especially in the case of the star block polymers, no indications of free-radical star-star couplings were observed, which would be noticeable, for instance, at double the number-average $M_n$. There were likewise no indications of crosslinking, which would be noticeable by outliers toward higher molecular weights.

Comparative Example 2

The synthesis of a PAMA without N/O-functional comonomers (cf. R. M. Mortier, S. T. Orszulik (eds.): "Chemistry and Technology of Lubricants", Blackie Academic & Professional, London, $2^{nd}$ ed. 1997; J. Bartz: "Additive für Schmierstoffe", Expert-Verlag, Renningen-Malmsheim 1994) is described hereinafter.

11.1 g of 12-15-alkyl methacrylate and 0.19 g of n-dodecyl mercaptan are filled together with 100 g of 100N oil into the 2 L reaction flask of an apparatus with a saber stirrer, condenser, thermometer, feed pump and $N_2$ inlet. The apparatus is inertized and heated to 100° C. using an oil bath. When the mixture in the reaction flask has reached a temperature of 100° C., 0.57 g of tert-butyl peroctoate is added.

At the same time, the feed of a mixture of 889 g of 12-15-alkyl methacrylate, 15.1 g of n-dodecyl mercaptan and 3.1 g of tert-butyl peroctoate by means of a pump is commenced. The addition is effected homogeneously over a period of 3.5 h at 100° C.

2 h and 4 h after the end of feeding, another 1.8 g each time of tert-butyl peroctoate are added, and the mixture is stirred at 100° C. for a further 2 h. This gives virtually 1000 g of a 90% clear solution.

TABLE 1

Molecular weights.

| | Mw, apparent [g/mol] | PDI |
|---|---|---|
| Comparative example 1 | 21700 | 1.82 |

TABLE 1-continued

Molecular weights.

| | Mw, apparent [g/mol] | PDI |
|---|---|---|
| Example 1 | 36600 | 2.64 |
| Example 2 | 22100 | 1.32 |
| Example 3 | 46660 | 1.20 |
| Comparative example 2 | 25400 | 1.86 |

Use Examples

A fully formulated base fluid, which, however, is free of VI improver, comprising API (American Petroleum Institute) group III base oil plus DI package (dispersant inhibitor package) comprising dispersant, detergent, defoamer, corrosion inhibitor, antioxidant, antiwear additive and extreme pressure additive, friction modifier) of KV40=22.32 cSt, KV100=4.654 cSt and VI=128 was used.

The polymers specified above were adjusted to KV100=6.5 cSt (ASTM D445) in the base fluid. The typical formulation parameters of KV40 and viscosity index VI (ASTM 2270) were determined. It is also possible to examine KV20, low-temperature BF-40 (test instrument from Brookfield, DIN 51398) and shear stability to DIN 51350-6 (20 h, tapered roller bearing). Table 2 shows the properties of the compositions obtained and the amounts of polymer used. Use example 1 comprises the polymer according to preparation example 1, this statement also applying to the further preparation examples and comparative examples.

In addition, an antiwear and extreme pressure additive obtainable commercially from Rheinchemie (Mannheim/Germany) under the Additin® RC 3760 trade name was examined, with the data obtained thereby shown in table 2 as comparative example 3. The given additive is a tri(dodecyl)amine-neutralized hexylphosphoric ester with a degree of esterification of 1.5. The product is highly viscous and free of solvent.

TABLE 2

Compositions examined

| | Additive concentration | Polymer concentration | KV100 [mm²/s] | Viscosity index (VI) |
|---|---|---|---|---|
| Comparative example 1 | 8.6% | 7.3% | 6.49 | 158 |
| Comparative example 2 | 8.0% | 7.2% | 6.52 | 161 |
| Comparative example 3 | 24.5% | | 6.45 | 128 |
| Example 1 | 8.0% | 5.9% | 6.51 | 167 |
| Example 2 | 13.5% | 6.8% | 6.54 | 169 |
| Example 3 | 2.8% | 2.8% | 6.80 | 171 |

To determine the fatigue, the above-described methods according to DIN 51350-1 (FBA, four-ball apparatus) and according to DIN 51819-1 with an FE8 roller bearing lubricant test rig from FAG (FAG FE8; Schaeffler KG, Schweinfurt) were used.

The determination of a fatigue time requires several tests under the same operating conditions. A fatigue time can be represented either as an arithmetic mean or, in the case of a sufficient number of tests, with the aid of Weibull statistics (W. Weibull: "Fatigue Testing and Analysis of Results", Pergamon Press 1961), as a fatigue time for failure probability $P_f$=50%. This means that 50% of all samples have exhibited fatigue by the time specified. The failure probability $P_f$ should not be confused with the confidence level $P_c$ of the study, which is $P_c$=90%.

Table 3 compiles the results obtained from the determination of fatigue times. The results show clearly that the inventive examples (at equal KV100) significantly increase the fatigue time compared to the prior art.

TABLE 3

Fatigue times of the compositions examined

| | FBA: Weibull mean from 10 tests [Revolutions] | FAG FE8: arithmetic mean from 2 tests [Hours] |
|---|---|---|
| Comparative example 1 | 136 810 | |
| Comparative example 2 | 108 040 | 148 |
| Comparative example 3 | 106 860 | |
| Example 1 | 148 775 | 476 |
| Example 2 | 150 550 | 1987 |
| Example 3 | 146 530 | |

In addition, the composition obtained with the polymer according to example 1 was evaluated according to the above-described FZG PT-C 10/120 test and the FZG PTX-C 10/90 test. The composition comprising the polymers according to example 1 achieved a value of 36.0 hours (FZG PT-C 10/120) and 242 hours (FZG PTX-C 10/90). These data are based on an arithmetic mean from 3 (FZG PT-C 10/120) or 2 (FZG PTX-C 10/90) tests.

The invention claimed is:

1. A method to protect a metal gear or a metal roller bearing from fatigue damage, comprising:

contacting a sliding or rolling surface of the metal gear or metal roller bearing which is subject to repeated application of forces resulting in metal removal and formation of cavities on the surface with a lubricant composition which protects the gear or roller bearing from the formation of cracks in the metal lattice at depths of 20-40 μm and 100-500 μm from the metal surface; wherein the lubricant composition comprises a polymer, the polymer comprising:

at least one ester group and at least one nonpolar segment P; and at least one polar segment D comprising dispersing units, wherein the polymer comprising at least one ester group has a weight-average molecular weight in the range from 15,000 to 80,000 g/mol, the polar segment D has at least 12 repeat units and a proportion by weight of dispersing repeat units in the polar segment D is at least 30%, based on the weight of the polar segment D;

wherein the at least one nonpolar segment P is obtained by a process comprising polymerizing a monomer composition which comprises:

a) 0 to 40% by weight, based on the weight of the monomer composition for preparing the nonpolar segments, of one or more ethylenically unsaturated ester compounds of formula (I)

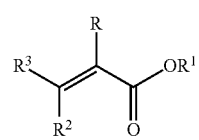

wherein

R is hydrogen or methyl, R' is a linear or branched alkyl radical having 1 to 6 carbon atoms, $R^2$ and $R^3$ are each independently hydrogen or a group of the formula —COOR' in which R' is hydrogen or an alkyl group having 1 to 6 carbon atoms, b) 5 to 100% by weight, based on the weight of the monomer composition for preparing the nonpolar segments, of one or more ethylenically unsaturated ester compounds of formula (II)

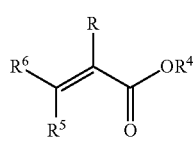

wherein

R is hydrogen or methyl, $R^4$ is a linear or branched alkyl radical having 7 to 15 carbon atoms, $R^5$ and $R^6$ are each independently hydrogen or a group of the formula —COOR" in which R" is hydrogen or an alkyl group having 7 to 15 carbon atoms, c) 0 to 80% by weight, based on the weight of the monomer composition for preparing the nonpolar segments, of one or more ethylenically unsaturated ester compounds of formula (III)

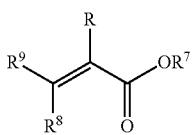

wherein

R is hydrogen or methyl, $R^7$ is a linear or branched alkyl radical having 16 to 30 carbon atoms, $R^8$ and $R^9$ are each independently hydrogen or a group of the formula —COOR'" in which R'" is hydrogen or an alkyl group having 16 to 30 carbon atoms, and d) 0 to 50% by weight, based on the weight of the monomer composition for preparing the nonpolar segments, of comonomer, and wherein the dispersing repeat units are derived from one or more ethylenically unsaturated polar ester compounds of formula (IV)

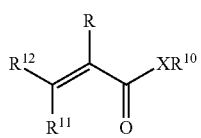

wherein
R is hydrogen or methyl, X is oxygen, sulfur or an amino group of the formula —NH— or —NR$^a$— in which R$^a$ is an alkyl radical having 1 to 40 carbon atoms, R$^{10}$ is a radical which comprises 2 to 20 carbon atoms and has at least one heteroatom, R$^{11}$ and R$^{12}$ are each independently hydrogen or a group of the formula —COX'R$^{10'}$ in which X' is oxygen or an amino group of the formula —NH— or —NR$^{a'}$—, in which R$^{a'}$ is an alkyl radical having 1 to 40 carbon atoms, and R$^{10'}$ is a radical comprising 1 to 100 carbon atoms, or from heterocyclic vinyl compounds, or mixtures thereof.

2. The method as claimed in claim 1, wherein the proportion by weight of dispersing repeat units is at least 40%, based on the weight of the polar segment D.

3. The method as claimed in claim 1, wherein the polymer comprising ester groups is at least one selected from the group consisting of polyalkyl (meth)acrylate (PAMA), polyalkyl fumarate and polyalkyl maleate.

4. The method as claimed in claim 1, wherein the lubricant is a transmission oil, motor oil or hydraulic oil.

5. The method as claimed in claim 1, wherein the polar segment D comprises at least three units derived from monomers of formula (IV) or from heterocyclic vinyl compounds, or mixtures thereof, which are bonded directly to one another.

6. The method as claimed in claim 1, wherein the polar segment D comprises a heterocyclic vinyl compound and the heterocyclic vinyl compound is selected from the group consisting of 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, N-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazole, hydrogenated vinylthiazole, vinyloxazole and hydrogenated vinyloxazole.

7. The method as claimed in claim 1, wherein the polar segment D comprises an ethylenically unsaturated polar ester compound of formula (IV) and the ethylenically unsaturated polar ester compound of formula (IV) is an aminoalkyl (meth) acrylate, an aminoalkyl(meth)acrylamide, a hydroxyalkyl (meth)acrylate, a heterocyclic (meth)acrylate or a carbonyl-containing (meth)acrylate, or a mixture thereof.

8. The method as claimed in claim 7, wherein the ethylenically unsaturated polar ester compound of formula (IV) is selected from the group consisting of 2-hydroxypropyl methacrylate, 2-hydroxyethyl methacrylate, mono-2-methacryloyloxyethyl succinate, N-(2-methacryloyloxyethyl)ethyleneurea, 2-acetoacetoxyethyl methacrylate, 2-(4-morpholinyl)ethyl methacrylate, dimethylaminodiglycol methacrylate, dimethylaminoethyl methacrylate and dimethylaminopropylmethacrylamide.

9. The method as claimed in claim 1, wherein a weight ratio of the hydrophobic segments to the polar segments is from 100:1 to 1:1.

10. The method as claimed in claim 1, wherein the polymer comprising at least one ester group is a diblock, triblock, multiblock, comb or star copolymer, or mixture thereof.

11. The method as claimed in claim 1, wherein the polymer comprising ester groups has a polydispersity $M_w/M_n$ in the range from 1.05 to 4.0.

12. The method as claimed in claim 1, wherein the lubricant has a PSSI to DIN 51350-6 (20 h) of less than or equal to 100.

13. The method as claimed in claim 1, wherein the lubricant comprises 0.01 to 30% by weight of polymer which comprises ester groups and has at least one nonpolar segment P and at least one polar segment D.

14. The method as claimed in claim 1, wherein the lubricant comprises at least one mineral oil or a synthetic oil or both.

15. The method as claimed in claim 1, wherein the lubricant comprises at least one additive which is selected from the group consisting of a viscosity index improver, a pour point improver, a dispersant, a detergent, a defoamer, a corrosion inhibitor, an antioxidant, an antiwear additive, an extreme pressure additive and a friction modifier.

16. The method as claimed in claim 15, wherein the additive is an antiwear additive or extreme pressure additive which is selected from the group consisting of a phosphorous compound, a compound comprising sulfur and phosphorous, a compound comprising sulfur and nitrogen, a sulfur compound comprising elemental sulfur and $H_2S$-sulfurized hydrocarbons, a sulfurized glyceride, a fatty acid ester, overbased sulfonate, a chlorine compound, graphite and an molybdenum disulfide.

17. The method as claimed in claim 1, wherein the at least one nonpolar segment P is obtained by polymerizing a monomer composition which comprises 0.1 to 30% by weight, based on the weight of the monomer composition for preparing the nonpolar segments, of one or more ethylenically unsaturated ester compounds of formula (I).

18. The method as claimed in claim 1, wherein
a concentration of the polymer is from 2.8 to 5.9% by weight,
a viscosity index of the lubricant is from 165 to 175, and
a fatigue time for failure probability ($P_f$=50%) according to DIN 51819-1 is greater than 400 hours.

* * * * *

UNITED STATES PATENT AND TRADEMARK OFFICE
CERTIFICATE OF CORRECTION

PATENT NO. : 8,859,472 B2
APPLICATION NO. : 12/672231
DATED : October 14, 2014
INVENTOR(S) : Torsten Stoehr et al.

It is certified that error appears in the above-identified patent and that said Letters Patent is hereby corrected as shown below:

On the title page, Item (75), The 5th Inventor's City of Residence is incorrect.
Item (75) should read:

-- (75) Inventors: Torsten Stoehr, Frankfurt (DE);
                      Michael Mueller, Bensheim (DE);
                      Thorsten Bartels, Weisenheim (DE);
                      Christoph Wincierz, Darmstadt (DE);
                      Klaus Schimossek, Bensheim (DE);
                      Michael Neusius, Darmstadt (DE);
                      Dieter Janssen, Gross-Umstadt (DE);
                      Miriam-Kathrin Stihulka, Maintal (DE) --

Signed and Sealed this
Seventeenth Day of March, 2015

Michelle K. Lee
*Director of the United States Patent and Trademark Office*